(12) United States Patent
Tsao

(10) Patent No.: US 11,287,095 B2
(45) Date of Patent: Mar. 29, 2022

(54) LIGHTING SYSTEM FOR AN AIRCRAFT

(71) Applicant: ZODIAC AERO ELECTRIC, Montreuil (FR)

(72) Inventor: Christian Tsao, Rosny Sous Bois (FR)

(73) Assignee: SAFRAN ELECTRONICS & DEFENSE COCKPIT SOLUTIONS, Montreuil (FR)

( * ) Notice: Subject to any disclaimer, the term of this patent is extended or adjusted under 35 U.S.C. 154(b) by 53 days.

(21) Appl. No.: 16/040,408

(22) Filed: Jul. 19, 2018

(65) Prior Publication Data
US 2019/0032879 A1 Jan. 31, 2019

(30) Foreign Application Priority Data

Jul. 28, 2017 (FR) ...................................... 1757213

(51) Int. Cl.
*F21S 41/16* (2018.01)
*B64D 47/04* (2006.01)
*F21S 41/24* (2018.01)

(52) U.S. Cl.
CPC .............. *F21S 41/16* (2018.01); *B64D 47/04* (2013.01); *F21S 41/24* (2018.01)

(58) Field of Classification Search
CPC .... B64D 47/04; B64D 2203/00; B64D 47/02; F21S 41/16; F21S 41/24
See application file for complete search history.

(56) References Cited

U.S. PATENT DOCUMENTS

| 6,028,624 A | 2/2000 | Watkins |
| 9,643,736 B1 | 5/2017 | Ell |
| 2008/0137353 A1* | 6/2008 | Larsen .................... B64D 47/04 362/470 |
| 2012/0243203 A1* | 9/2012 | Koike ...................... F21S 41/14 362/19 |
| 2013/0182449 A1 | 7/2013 | Fidanza |
| 2015/0146442 A1 | 5/2015 | Bonnefous et al. |
| 2016/0076722 A1* | 3/2016 | Hessling von Heimendahl .......... B64D 47/04 362/470 |

(Continued)

FOREIGN PATENT DOCUMENTS

| DE | 102016214397 A1 | 2/2017 |
| FR | 2978425 A1 | 2/2013 |
| FR | 3013331 A1 | 5/2015 |

OTHER PUBLICATIONS

Rapport de Recherche Préliminaire / Opinion Écrite sur la Brevetabilité de l'Invention, mailed Apr. 9, 2018, issued in corresponding French Application No. 1757213, filed Jul. 28, 2017, 7 pages.

*Primary Examiner* — Margaret G Mastrodonato
(74) *Attorney, Agent, or Firm* — Christensen O'Connor Johnson Kindness PLLC

(57) ABSTRACT

Lighting system for an aircraft, comprising at least one optical acquisition device, at least one long-range headlight each comprising at least one light source (3a,3b), closed-loop control means (4), and a means (5) for controlling the light sources (3a,3b) as a function of the data received from the optical acquisition device and from a data network of the aircraft in such a manner that the lighting system produces at least one beam for adaptive illumination with respect to the flight and taxi phases of the aircraft so as to illuminate at least one predefined region of the space around the aircraft.

8 Claims, 4 Drawing Sheets

(56) References Cited

U.S. PATENT DOCUMENTS

| | | | |
|---|---|---|---|
| 2016/0300497 A1* | 10/2016 | He | G08G 5/0021 |
| 2016/0345408 A1* | 11/2016 | Schoen | B60Q 1/0023 |
| 2017/0036593 A1 | 2/2017 | Ichikawa | |
| 2017/0073083 A1* | 3/2017 | Hessling-von Heimendahl | B64D 47/04 |
| 2017/0275021 A1* | 9/2017 | Tsao | G02B 19/0028 |
| 2018/0157036 A1* | 6/2018 | Choi | G02B 27/0101 |
| 2020/0191352 A1* | 6/2020 | Zozgornik | F21S 41/365 |

* cited by examiner

LIGHTING SYSTEM FOR AN AIRCRAFT

BACKGROUND

Onboard runway lighting systems on aircraft currently comprise headlights associated, for all or in part, with a flight phase from amongst "taxi", "runway turn-off", "take-off" and "landing".

These headlights are separate and fixed at various locations on the aircraft, notably on a landing gear leg, generally of the front landing gear, and also on the wings, on the attack edge, in the wing root of the wing on the fuselage, under the ventral fairing or under the wing for certain retractable headlights.

At night, during the various flight phases, these various headlights are used successively or simultaneously in order to allow the pilot to identify the space in which the aircraft has to fly.

Each flight phase is thus associated with one or more lighting beams whose intensity distribution and aiming direction are different and adapted to the visibility needs of the pilots. FIG. 1 schematically illustrates a possible disposition of the various light beams, together with a part of the associated headlights. It should be noted that the representation is in the plane of the aircraft and does not therefore show the differences in aiming direction with respect to this plane. The lighting beams in a landing phase are referenced L. The lighting beams in a taxi phase are referenced T, the lighting beams in a runway turn-off phase are referenced R and the lighting beams in a takeoff phase are referenced TO.

In an approach phase, the landing lights, referenced L in FIG. 1, are aimed along the descent path (rectilinear path) in such a manner as to illuminate the location where the airplane is to touch the ground. This is the location where the pilot must focus their gaze.

In the touch down phase, prior to the mean landing gear touching down, the attitude of the airplane varies and tilts up slightly. The path of the airplane changes and becomes rounded so as to be tangent to the runway.

Since the touch-down phase is very short, no beam, until now, has been specifically dedicated to this phase.

Just after the touch-down phase, the front landing gear comes into contact with the ground. The take-off lights then take over with an aiming direction virtually parallel to the ground. These headlights illuminate the runway in front of the aircraft.

The beams for the take-off and landing phases are characterized by a type of beam whose spatial light intensity distribution is identical and collimated onto the aiming direction; at the end of the runway for the take-off phase and along the glide slope for the landing phase.

In the taxi phase, the taxi light and the runway turn-off light are used on the taxiways for leaving or accessing the runway. The illumination during this phase is characterized by a light distribution that is widely spread out horizontally in order to identify an obstacle around the aircraft, principally in front of the cockpit (taxi light) and in front of the wings (runway turn-off light).

These beams must remain concentrated vertically and directed down to the ground so as to minimize the dazzling of the ground staff crossing these two types of beam.

These lighting systems have significant drawbacks. First of all, the headlights are fixed and cannot therefore follow the variations in angles of incidence of the aircraft during the landing and take-off phases, notably when there are variations in direction or in strength of the prevailing winds. Owing to the significant variations in attitude of the aircraft, in view of the required aiming precision, the illumination thus achieved on the runway may be very variable in efficiency and in directionality.

The use of a wide number of separate headlights also has the drawback of a significant size and weight, both critical parameters in aeronautics.

Furthermore, the electrical consumption and the number of locations needed to ensure a satisfactory illumination in view of the required performance characteristics create a significant constraint for installation and electrical power supply.

In addition, simultaneously turning on the landing and take-off beams degrades the visual perception of the pilots because of the backscattering of light from the haze in humid air which reduces the contrast in the areas being observed. Indeed, the reflecting headlights used in aeronautics only reflect around half the light generated by the mirror for forming the beam. The rest of the light generated by the source does not undergo any reflection and comes directly out of the airplane in a very wide solid angle. A part of this lost light passes between the pilot and the beam used to illuminate the scene. When the weather is dry, this beam of lost light does not illuminate particles in suspension in the air, within the field of view of the pilot. On the other hand, in misty periods, the particles in suspension in the field of view of the pilot are illuminated, creating a more or less dense veil of backscattered light. This backscattering degrades the contrast and can dazzle the pilot, notably when the fog is dense.

There accordingly exists a need for a lighting system for aircraft comprising a limited number of headlights with respect to the existing system while at the same time providing an at least equal illumination.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention relates to the technical field of lighting systems, and more particularly onboard lighting systems for aircraft.

One subject of the invention is a lighting system for an aircraft, comprising at least one optical acquisition device, at least one long-range headlight each comprising at least one light source, closed-loop control means, and a means for controlling the light sources as a function of the data received from the optical acquisition device and from a data network of the aircraft in such a manner that the lighting system produces at least one beam for adaptive illumination with respect to the flight and taxi phases of the aircraft so as to illuminate at least one predefined region of the space around the aircraft.

The long-range headlight may be designed to illuminate a runway for aircraft to a distance of at least 300 m.

The long-range headlight may comprise a high-speed scanning device equipped with at least two rotary reflecting surfaces, whose axes of rotation are orthogonal and disposed in such a manner that the beam at the exit of the light source is successively reflected on one then the other of the reflecting surfaces.

The long-range headlight may comprise at least one centered optical system of variable focal point or at least one centered optical system of fixed focal point whose focal plane is occupied by a light source, together with means of moving the light source such that the direction of the light beam can be inclined with respect to the axis of the centered optical system and/or moved perpendicularly to the focal plane such that the aperture of the beam may be enlarged.

The long-range headlight may comprise a prismatic striated glass, disposed at the exit of the centered optical system allowing at least one lighting beam to be generated.

The long-range headlight may comprise an assembly of at least two luminophores, each designed to absorb the light emitted by a light source and to re-emit white light.

The light source may be a source of the laser type or a light source of the laser type obtained by combination of a red monochromatic light source of the laser type, of a green monochromatic light source of the laser type and of a blue monochromatic light source of the laser type.

Another subject of the invention is a method for controlling a lighting system comprising the following steps:

an image of the scene in front of the airplane is acquired with at least one optical acquisition device, a shape recognition is performed on the acquired image of the scene in order to distinguish the various objects present, notably the runway, the ground signaling, and any potential obstacles, flight information is obtained from the data network of the aircraft, the flight phase in progress is determined as a function of the information acquired and of a predetermined model, at least one lighting beam to be turned on is determined, together with their direction and their distributions according to the flight phase determined and the objects recognized in front of the airplane, the setpoints are determined for direction of the light sources, for the closed-loop control means and, when it is applicable, for the means of moving at least one light source depending on the lighting beams to be illuminated, and also their directions and their distributions.

The flight information may comprise at least one value from amongst the speed, the altitude, the attitude angle, the thrust, the state of inversion of the thrust, the contact of the wheels with the ground, the position of the attack edges and of the flaps.

In order to determine at least one lighting beam to be turned on, together with their direction and their distribution, for each lighting beam to be turned on, the vertical angle, the horizontal angle and the aiming direction of the beam may be determined as a function of predetermined values of the coordinates and of the extent of the area to be lit in such a manner that the beam illuminates a predefined region of the space around the aircraft, then the determined values may be corrected as a function of the flight data comprising at least the respective positions of the runway and of the aircraft.

The lighting system offers the advantage of being a multifunction and flexible system, configurable in extent and in direction from the very long range areas beyond the conventional landing functions, thanks to the use of laser technology, down to the nearby taxiing areas of the aircraft.

The system also offers the advantage of a closed-loop control and of an adaptation of the beams in the vertical and horizontal directions by virtue of the use of an optical acquisition device and of a control method allowing the monitoring and the analysis of the areas to be lit.

The lighting system is also advantageous with respect to the existing systems by the reduction in the dazzling effects and in the stray light sources owing to the use of a collimated laser beam and by the reduction in the amount of equipment needed for the production of the various lighting beams of an aircraft.

Finally, the invention may be used as a complement to conventional lighting by being integrated into a lighting system of the LED, HID or Halogen type. In this configuration, the invention is closed-loop controlled in aiming direction with respect to the image processing coming from the integrated optical acquisition device. If the closed-loop control is not operational then the aiming direction of the lighting laser beam will be appropriately predetermined in a default aiming direction.

DESCRIPTION OF THE DRAWINGS

Other aims, features and advantages of the invention will become apparent upon reading the following description, provided solely by way of non-limiting example and presented with reference to the appended drawings in which.

DETAILED DESCRIPTION

Figure 1:
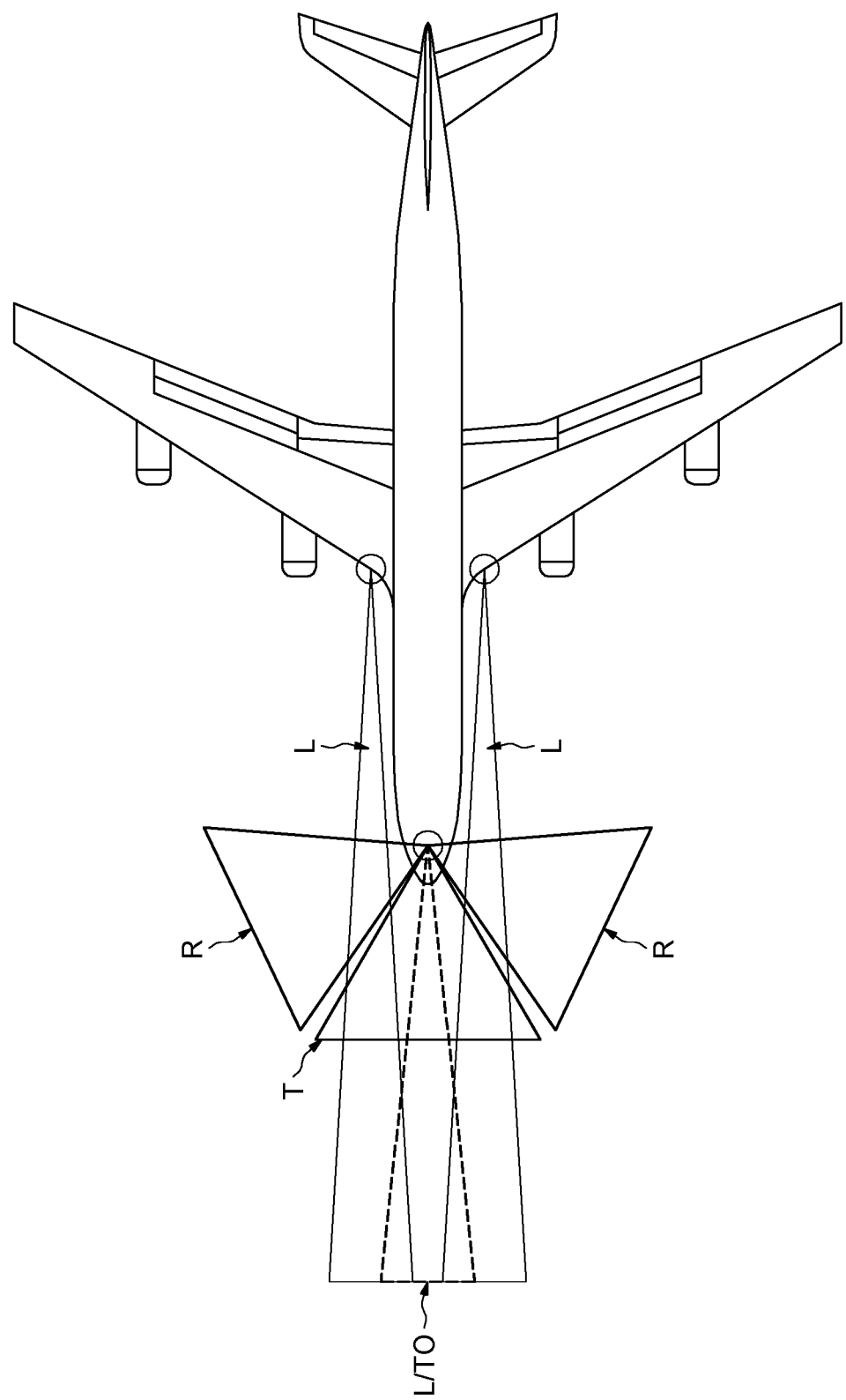
FIG. 1 illustrates a disposition of the various light beams on an aircraft according to one embodiment of the prior art.
Figure 2:
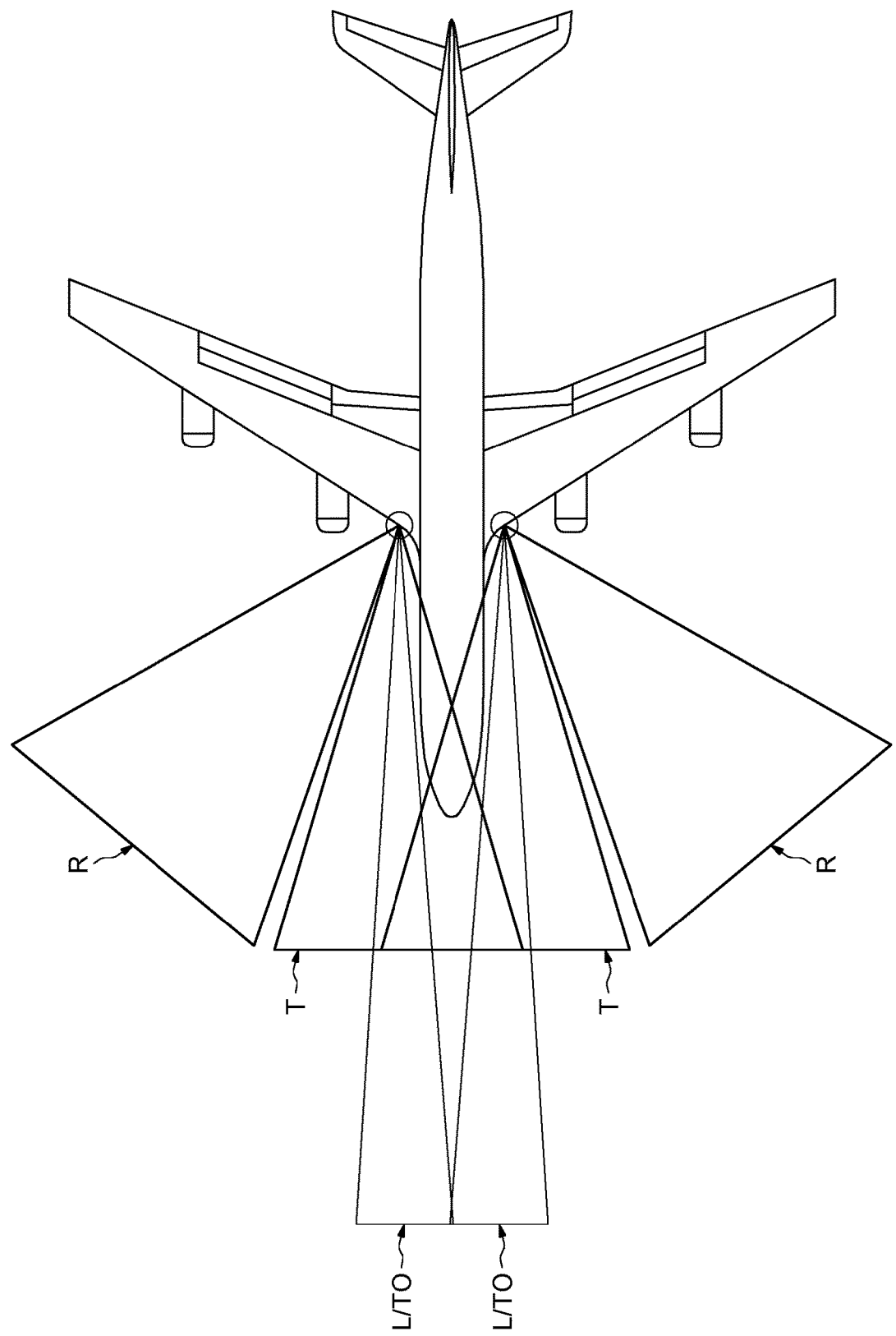
FIG. 2 illustrates the various lighting beams generated by the lighting system according to one embodiment of the invention.

The lighting system 1 according to the invention allows all of the headlights associated with the various flight phases of the aircraft to be replaced by at least one long-range headlight closed-loop controlled in aiming direction (orientation) and in light intensity distribution (extent) with respect to the various flight phases described previously. FIG. 2 illustrates the various lighting beams generated by the lighting system 1 according to the invention. It should be noted that, here, the take-off and landing beams are combined and referenced L/TO.

The lighting system 1 allows not only the amount of equipment required to be reduced, but also the performance characteristics to be optimized in order to improve the elements of the scene surrounding the aircraft visible to the pilot according to each flight phase and the lighting range of the approach and landing beams to be increased.

The lighting system 1 is designed to create at least one lighting beam for each flight phase from amongst the taxi, the runway turn-off, the take-off and the landing. Alternatively, the lighting system 1 is designed to create all or part of these lighting beams.

The lighting system 1 comprises an optical acquisition device 2, at least one long-range headlight 12a, 12b, 13a, 13b, 14a, 14b comprising a light source 3a,3b, closed-loop control means 4, and a means 5 for controlling the light sources 3a,3b and closed-loop control means 4 and, when it is applicable, means of moving at least one light source 3a,3b.

Control of the light sources 3a,3b is understood to mean the duration of illumination, the control of the high-speed scanning device and their synchronization.

All the elements included in the lighting system 1 are disposed as close as possible to one another so as to avoid the drawbacks described in the introduction.

The control means 5 and the closed-loop control means 4 allow the extent and the direction of at least one light beam 6a,6b to be modified according to the flight phases (approach, landing, taxi and take-off) in such a manner that the light beams produced correspond at least to the light beams produced by the lighting systems equipping aircraft according to the prior art.

Various embodiments of the invention will now be described relating to the generation of the beams illustrated in FIG. 2. These embodiments make reference to two long-range headlights, each disposed on one wing of the aircraft, notably close to their wing roots. However, it can be clearly seen that the number and the disposition of the long-range headlights may be modified without straying from the scope of the invention and without this corresponding to any inventive step. Notably, when installed on the ventral fairing of the aircraft, only one long-range headlight may be used.

Figure 3:
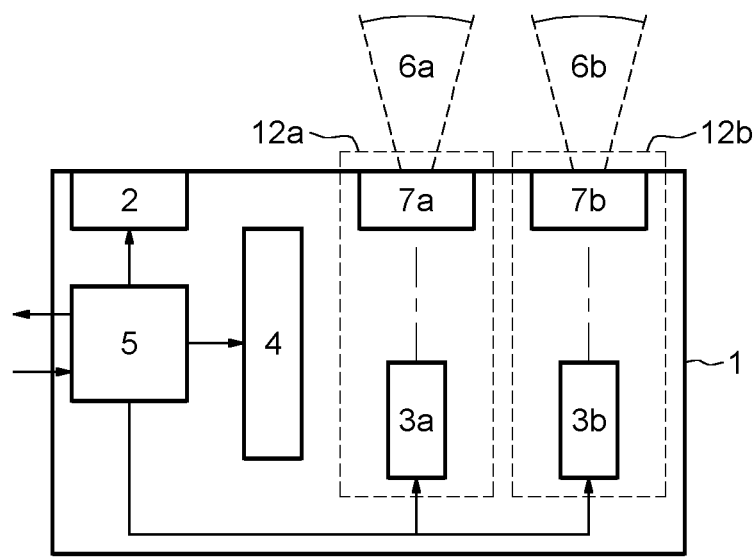
FIG. 3 illustrates a first embodiment of a lighting system according to the invention.

In a first embodiment illustrated in FIG. 3, the lighting system 1 comprises two long-range headlights 12a,12b each comprising a high-speed scanning device 7a,7b equipped with at least two rotary reflecting surfaces whose axes of rotation are orthogonal. Each assembly of at least two reflecting surfaces is disposed in such a manner that the beam at the exit of the corresponding light source 3a,3b is successively reflected on one then the other of the reflecting surfaces 7a,7b in rotation. Each reflecting surface is directly connected to the axis of a motor such that the axis of the motor is included in the plane of the reflecting surface.

Depending on the position of the reflecting surfaces, their angular speeds and the duration of illumination of the light source, it is possible to illuminate a point, a straight line, or a curve. It is also possible to illuminate a surface by juxtaposing a set of straight lines that are close enough such that the observer does not see the gaps between them. Combined with a scanning speed shorter than the retinal persistence time, it is thus possible to form complex figures traced out by a single point.

In one particular embodiment, the light source 3a,3b is a source of the laser type.

The light sources of the laser type offer the advantage of being able to generate a far greater luminance than the other light sources (LED, Incandescent or Discharge). The emitted light intensity may thus be collimated and channeled into an extremely fine beam and narrow solid angle, which allows its range to be increased.

Nor do light sources of the laser type emit any lost light. Since the scanning of the laser spot remains within the solid angle of the useful beam, the lost light is non-existent. This does not create any stray backscattering outside of the useful beam. This situation improves the contrast of the illuminated scene and avoids the dazzling effects on the pilot in the presence of particles or of fog.

In another particular embodiment, the light source 3a,3b is obtained by combination of three monochromatic light sources of the laser type, red, green and blue. The light source thus obtained provides the benefit of the characteristics of laser sources while at the same time generating a color coming from the chromatic combination of the red, green and blue sources. It is thus possible to obtain a white color or any color of the visible spectrum. Such a feature allows the illumination white light such as specified in the aeronautical standards to be reproduced. Such a feature in combination with the capacity for projection of patterns also allows diagrams or texts to be projected onto the ground. It is thus possible to project information intended for the ground staff, notably warnings or positioning instructions (danger area in front of the jet engines, blind spots for the pilot, identification of the airplane, communication with the authorities in the case of aggression of the occupants (e.g. sos, etc.).

Figure 4:
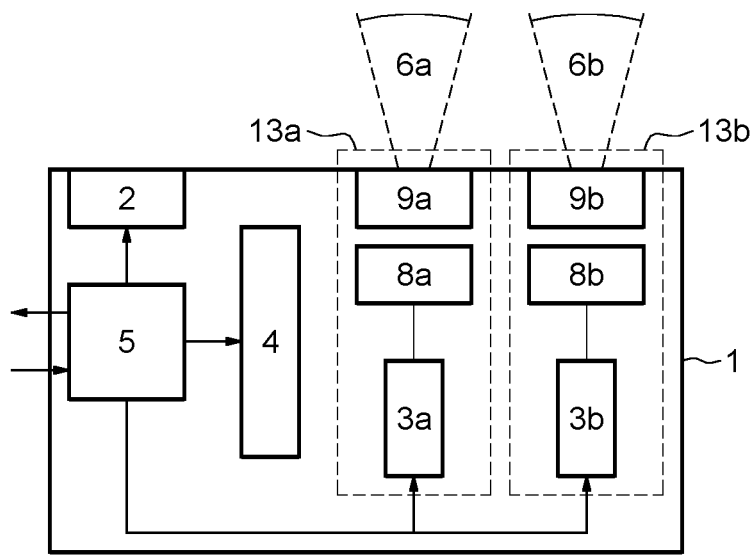
FIG. 4 illustrates a second embodiment of a lighting system according to the invention.

According to another embodiment illustrated in FIG. 4, each long-range headlight 13a,13b of the lighting system 1 furthermore comprises at least one centered optical system with variable focal point 8a,8b whose focal point is occupied by the light source 3a,3b.

The centered optical system 8a,8b is equipped with means of moving the long-range light source 3a,3b such that the direction of the light beam can be offset around the axis of the centered optical system 8a,8b. In other words, the light source 3a,3b may be moved in a plane perpendicular to the direction of the axis of the centered optical system 8a,8b. When the axis of the centered optical system 8a,8b is not aligned with the light beam, the focal point of the light beam at the exit of the centered optical system 8a,8b is offset from the axis in such a manner that the beam is deviated.

Furthermore, the variation in focal point of the centered optical system 8a,8b allows a shaping of the beam.

The centered optical system 8a,8b may also be equipped with a glass with striated and prismatic regions 9a,9b allowing the final lighting beam 6a,6b to be generated. The prismatic regions allow the incident rays to be deviated. The striated regions allow the incident rays to be spread out. The prismatic regions and the striated regions may be superposed in order to spread out and deviate the incident rays. A glass element with prismatic striations thus allows the lighting beam to be deviated, distributed and generated.

Used in combination, the centered optical system 8a,8b and the glass element with prismatic striations 9a,9b allow several beams with various orientations to be generated from a single source. By providing several regions of the glass element with prismatic striations 9 equipped with various combinations of prisms and of striations, the generation of different beams can be allowed, each having a different offset and distribution.

Since the centered optical system 8a,8b allows the area to be lit and its centering to be chosen, it is then possible to selectively illuminate each region of the glass element with prismatic striations 9a,9b so as to choose which beam is illuminated depending on the beams provided on the glass element with prismatic striations. It is also possible to generate several beams by illuminating a larger area of the glass element with prismatic striations 9a,9b.

Furthermore, the lighting system 1 may comprise several centered optical systems each associated with at least one glass element with prismatic striations.

In one particular embodiment, the light source 3a,3b is a source of the laser type. In another particular embodiment, the light source 3a,3b is obtained by combining three monochromatic light sources of the laser type: red, green and blue. The light source thus obtained allows advantage to be taken of the characteristics of the laser sources while at the same time producing a color coming from the chromatic combination of the red, green and blue sources. It is thus possible to obtain a white color or any color of the visible spectrum. Such a feature allows the white illumination light such as specified in the aeronautical standards to be reproduced. Such a feature in combination with the capacity for projection of patterns also allows diagrams or texts to be projected onto the ground. It is thus possible to project information intended for the ground staff, notably warnings or positioning instructions (danger area in front of the jet engines, blind spots for the pilot, identification of the airplane, communication with the authorities in the case of aggression of the occupants (e.g. SOS, etc.).

Figure 5:
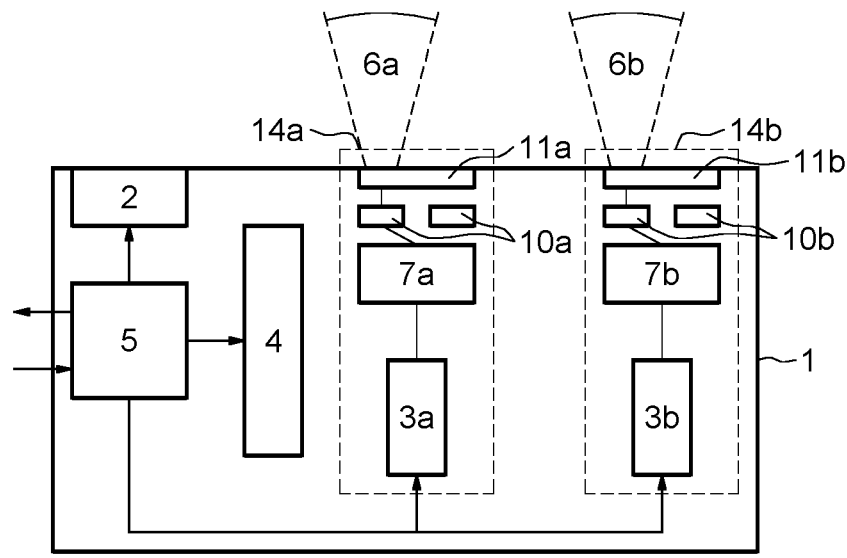
FIG. 5 illustrates a third embodiment of a lighting system according to the invention.

According to another embodiment illustrated in FIG. 5, each long-range headlight 14a,14b of the lighting system 1 comprises an assembly 10a,10b of at least two luminophores. It is recalled that a luminophore is a substance which absorbs light at a first wavelength and then re-emits light at a second wavelength.

The luminophores 10a,10b are disposed so as to each cover a predefined direction for emission of a light beam in such a manner that each aiming direction is covered by the illumination of the corresponding luminophore.

The illumination of one of the luminophores 10a,10b is carried out either by the illumination of a corresponding light source, notably a laser source at the frequency of absorption of the luminophore. In one particular embodiment, the light source 3a,3b of the laser type and the luminophores 10a,10b are fixed with respect to one another. The closed-loop control of a beam projection and shaping optical system allows the illumination of the predefined runway areas during the various approach, landing, taxi and take-off phases at night.

The illumination of one of the luminophores 10a,10b may also be achieved by a selective scanning of the luminophore by means of a light source 3a,3b associated with a high-speed scanning device 7a,7b such as illustrated in FIG. 5. In the latter case, several luminophores may be illuminated by a single light source.

In both cases, each of the luminophores 10a,10b behaves as a secondary light source and is disposed at the focal point of a projection optical system 11a,11b.

Figure 6:
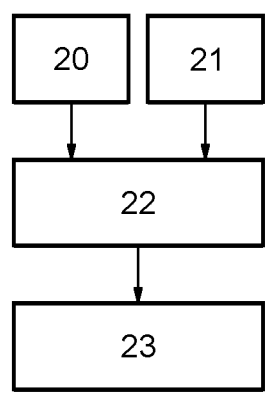
FIG. 6 illustrates the various steps of a method for controlling the lighting system according to the invention.

FIG. 6 illustrates the various steps of a control method according to the invention.

During a first step 20, an image of the scene in front of the airplane is acquired. Subsequently, a shape recognition is carried out in order to distinguish the various objects present, notably the runway, the signaling on the ground, and potential obstacles.

During a second step 21, flight information is obtained from the data network of the aircraft in order to determine the flight phase in progress. This information notably comprises the speed, the altitude, and also the attitude angle. Other information may be taken into account such as the thrust, the state of inversion of the thrust, the contact of the wheels with the ground, the position of the attack edges and of the flaps. Depending on the information acquired and on a predetermined model, the flight phase under way is determined.

During a third step 22, the at least one lighting beam to be turned on, together with their direction and their distribution, are determined according to the determined flight phase and to the objects recognized in front of the airplane.

In order to carry this out, and for each lighting beam to be turned on, the vertical angle, the horizontal angle and the aiming direction of the beam are determined by means of an image processing algorithm, the latter coming from the integrated optical acquisition device, in such a manner that the beam illuminates a predefined region of the space in front of the aircraft. Thus, for each type of lighting beam, the coordinates and the extent of the area to be illuminated are stored in memory. These values are subsequently corrected according to the flight data and the objects recognized. Notably, the coordinates and the extent of the area to be illuminated are corrected as a function of the respective positions of the runway and of the airplane.

Once the direction and the distribution of each lighting beam has been determined, during a fourth step 23, the setpoints are determined corresponding to the direction of the light sources 3a,3b, for the closed-loop control means 4 and, when it is applicable, for the means of moving at least one light source.

The method is executed in a loop for as long as the aircraft is in one of the flight phases concerned.

While illustrative embodiments have been illustrated and described, it will be appreciated that various changes can be made therein without departing from the spirit and scope of the invention.

The embodiments of the invention in which an exclusive property or privilege is claimed are defined as follows:

1. A lighting system for an aircraft, comprising at least one optical acquisition device, at least one long-range headlight, each comprising at least one light source, closed-loop control means, and a means for controlling the light sources as a function of the data received from the optical acquisition device and from a data network of the aircraft in such a manner that the lighting system produces at least one beam for adaptive illumination with respect to the flight and taxi phases of the aircraft so as to illuminate at least one predefined region of the space around the aircraft, the spatial distribution of the light and the direction of the at least one beam is determined by the optical acquisition device, and corrected according to the flight and taxi phases, the long-range headlight comprising at least one centered optical system with variable focal point or at least one centered optical system with fixed focal point whose focal plane is occupied by a light source, together with means of moving the light source such that the direction of the light beam may be inclined with respect to the axis of the centered optical system and/or moved perpendicularly to the focal plane such that the aperture of the beam may be enlarged,
the long-range headlight further comprising a glass with at least two striated and prismatic regions disposed at the exit of the centered optical system allowing at least two different lighting beams to be generated.

2. The lighting system according to claim 1, in which the long-range headlight is designed to illuminate an aircraft runway to a distance of at least 300 m.

3. The lighting system according to claim 1, in which the long-range headlight comprises a high-speed scanning device equipped with at least two rotary reflecting surfaces, whose axes of rotation are orthogonal and disposed in such a manner that the beam at the exit of the light source is successively reflected on one then the other of the reflecting surfaces.

4. The lighting system according to claim 1, in which the long-range headlight comprises an assembly of at least two luminophores, each designed to absorb the light emitted by a light source and to re-emit white light.

5. The lighting system according to claim 1, in which the light source is a light source of the laser type or a light source of the laser type obtained by combination of a red monochromatic light source of the laser type, of a green monochromatic light source of the laser type and of a blue monochromatic light source of the laser type.

6. A method for controlling a lighting system of claim 1, the method comprising the following steps:
an image of the scene in front of the airplane is acquired with at least one optical acquisition device,
a shape recognition is performed on the acquired image of the scene in order to distinguish the various objects present including the runway, the ground signaling, and any potential obstacles, flight information is obtained from the data network of the aircraft, the flight phase in progress is determined according to the acquired information and of a predetermined model, the spatial distribution of the light and the direction of the at least one beam is determined by the optical acquisition device, and corrected according to the flight and taxi phases, the setpoints are determined corresponding to the direction of the light sources, for the closed-loop control means and, when it is applicable, for the means of moving at least one light source according to the lighting beams to be illuminated, and also their directions and their distributions.

7. The method according to claim 6, in which the flight information comprises at least one value from amongst the speed, the altitude, the attitude angle, the thrust, the state of inversion of the thrust, the contact of the wheels with the ground, the position of the attack edges and of the flaps.

8. The method according to claim 6, in which, for determining at least one lighting beam to be turned on, together with their direction and their distribution, for each lighting beam to be turned on, the vertical angle, the horizontal angle and the aperture of the beam are determined as a function of predetermined values of the coordinates and of the extent of the area to be illuminated, in such a manner that the beam illuminates a predefined region of the space around the aircraft, then the determined values are corrected as a function of the flight data comprising at least the respective positions of the runway and of the aircraft.

* * * * *